US007171496B2

(12) United States Patent
Tanaka et al.

(10) Patent No.: US 7,171,496 B2
(45) Date of Patent: Jan. 30, 2007

(54) DATA BUS WIDTH CONVERSION APPARATUS AND DATA PROCESSING APPARATUS

(75) Inventors: Noriyuki Tanaka, Yamatokoriyama (JP); Toshiya Aoki, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 10/668,253

(22) Filed: Sep. 24, 2003

(65) Prior Publication Data
US 2004/0064595 A1    Apr. 1, 2004

(30) Foreign Application Priority Data
Sep. 24, 2002   (JP)   ............................. 2002-278208
Jun. 26, 2003   (JP)   ............................. 2003-183631

(51) Int. Cl.
*G06F 13/38*   (2006.01)
(52) U.S. Cl. ...................................................... 710/66
(58) Field of Classification Search ................ 710/305, 710/66, 68, 307, 29, 30, 33, 34, 35
See application file for complete search history.

(56) References Cited

U.S. PATENT DOCUMENTS

| | | | | |
|---|---|---|---|---|
| 4,593,373 A | * | 6/1986 | Kiuchi et al. ............... | 708/518 |
| 4,691,364 A | * | 9/1987 | Fukuzawa et al. .......... | 382/299 |
| 4,878,166 A | * | 10/1989 | Johnson et al. ............. | 710/307 |
| 5,040,232 A | * | 8/1991 | Kanno ......................... | 382/305 |
| 5,113,369 A | * | 5/1992 | Kinoshita ................... | 710/307 |
| 5,255,374 A | * | 10/1993 | Aldereguia et al. ......... | 710/113 |
| 5,295,000 A | * | 3/1994 | Nonoshita et al. .......... | 358/444 |
| 5,317,406 A | * | 5/1994 | Kobayashi et al. ......... | 348/307 |
| 5,487,760 A | | 1/1996 | Villafana | |

(Continued)

FOREIGN PATENT DOCUMENTS

| | | |
|---|---|---|
| JP | 01-233015 | 9/1989 |
| JP | 02-191730 | 7/1990 |
| JP | 04-044425 | 3/1992 |

OTHER PUBLICATIONS

Memorandum Opinion and Order, In the matter of Biotronik, Inc. Equipment Authorization for the Medical Implant Communications Service, FCC Identifier PG6BA0T, Adopted Feb. 12, 2003, Released Feb. 25, 2003, Before the Federal Communications Commission, Washington D.C. 20554.

*Primary Examiner*—Khanh Dang
(74) *Attorney, Agent, or Firm*—Harness, Dickey & Pierce, P.L.C.

(57) ABSTRACT

A data bus width conversion apparatus is provided for receiving N-bit data from a first device having a first bus width and outputting the N-bit data to a second device having a second bus width. The first device divides the N-bit data into a plurality of bit data groups and the plurality of bit data groups are transferred to the apparatus. The apparatus comprises a setting section for setting the total number of transfer operations required for the first device to transfer the plurality of bit data groups, and for setting a division pattern of the N-bit data for dividing the N-bit data into the plurality of bit data groups, a receiving section, and an output section for producing the N-bit data from the received data indicated by each of the plurality of bit data groups and outputting the produced N-bit data to the second device.

16 Claims, 10 Drawing Sheets

U.S. PATENT DOCUMENTS

| | | | |
|---|---|---|---|
| 5,680,151 | A * | 10/1997 | Grimm et al. ............... 345/419 |
| 5,745,791 | A * | 4/1998 | Peek et al. ..................... 710/52 |
| 5,761,348 | A * | 6/1998 | Honma ...................... 382/305 |
| 5,796,458 | A * | 8/1998 | Koike et al. ................. 349/126 |
| 5,802,399 | A * | 9/1998 | Yumoto et al. ............... 710/66 |
| 5,861,019 | A | 1/1999 | Sun et al. |
| 6,115,020 | A * | 9/2000 | Taguchi et al. ............... 345/99 |
| 6,115,636 | A | 9/2000 | Ryan |
| 6,150,951 | A | 11/2000 | Olejniczak |
| 6,167,312 | A | 12/2000 | Goedeke |
| 6,169,925 | B1 | 1/2001 | Villaseca et al. |
| 6,240,317 | B1 | 5/2001 | Villaseca et al. |
| 6,379,300 | B1 | 4/2002 | Haubrich |
| 6,414,609 | B1 * | 7/2002 | Zukawa et al. ................ 341/67 |
| 6,513,078 | B1 * | 1/2003 | Kaganoi et al. ............. 710/104 |
| 6,535,766 | B1 | 3/2003 | Thompson et al. |
| 6,639,524 | B2 * | 10/2003 | Schouhamer Immink .... 341/51 |
| 6,677,923 | B2 * | 1/2004 | Kajihara et al. ............... 345/89 |
| 6,877,050 | B2 * | 4/2005 | Kanzaki et al. ............. 710/100 |
| 2002/0042637 | A1 | 4/2002 | Stover |
| 2002/0045920 | A1 | 4/2002 | Thompson |
| 2002/0065539 | A1 | 5/2002 | Von Arx et al. |
| 2002/0095195 | A1 | 7/2002 | Mass et al. |
| 2002/0103514 | A1 | 8/2002 | Abrahamson |
| 2002/0123776 | A1 | 9/2002 | Von Arx et al. |

* cited by examiner

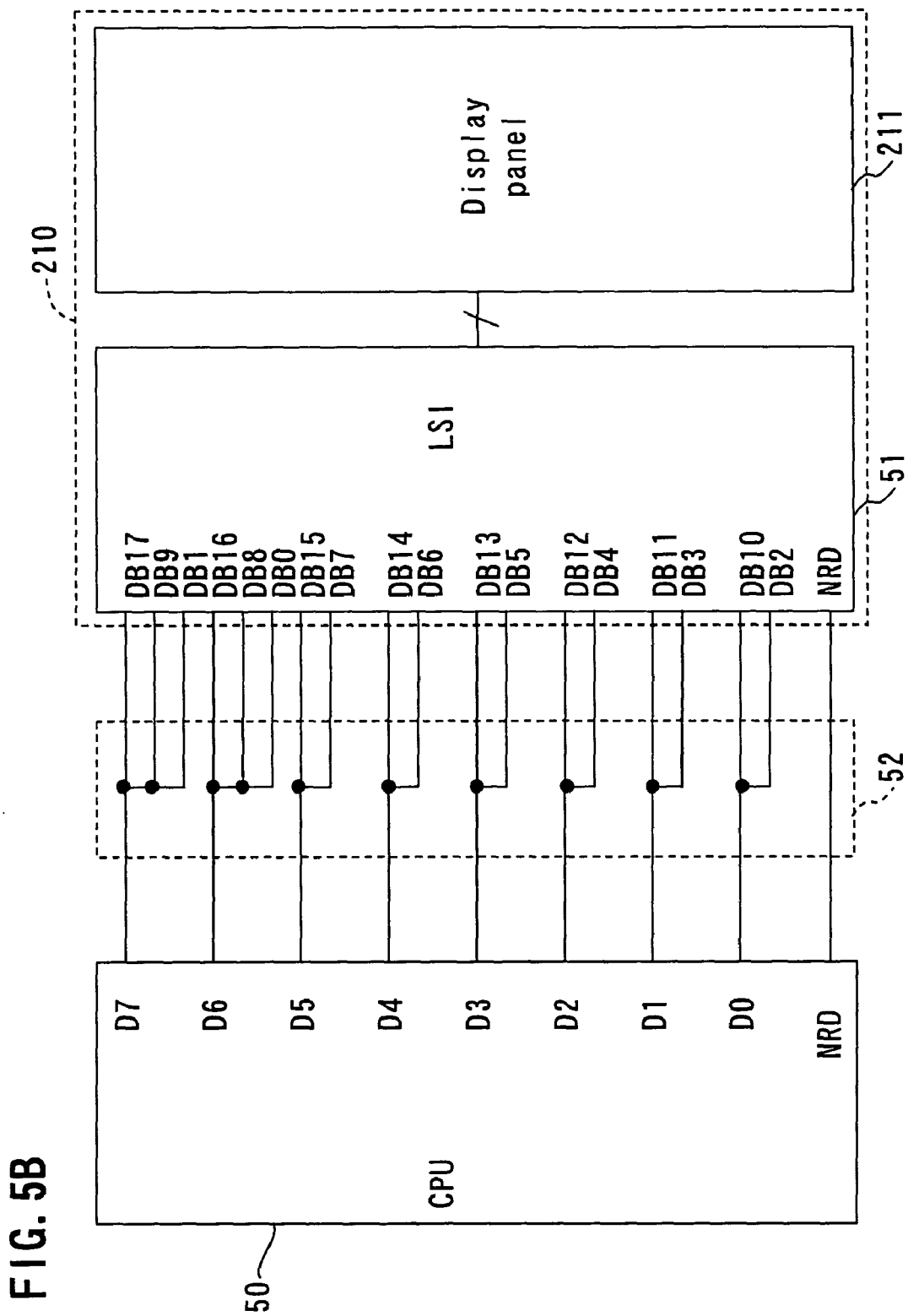

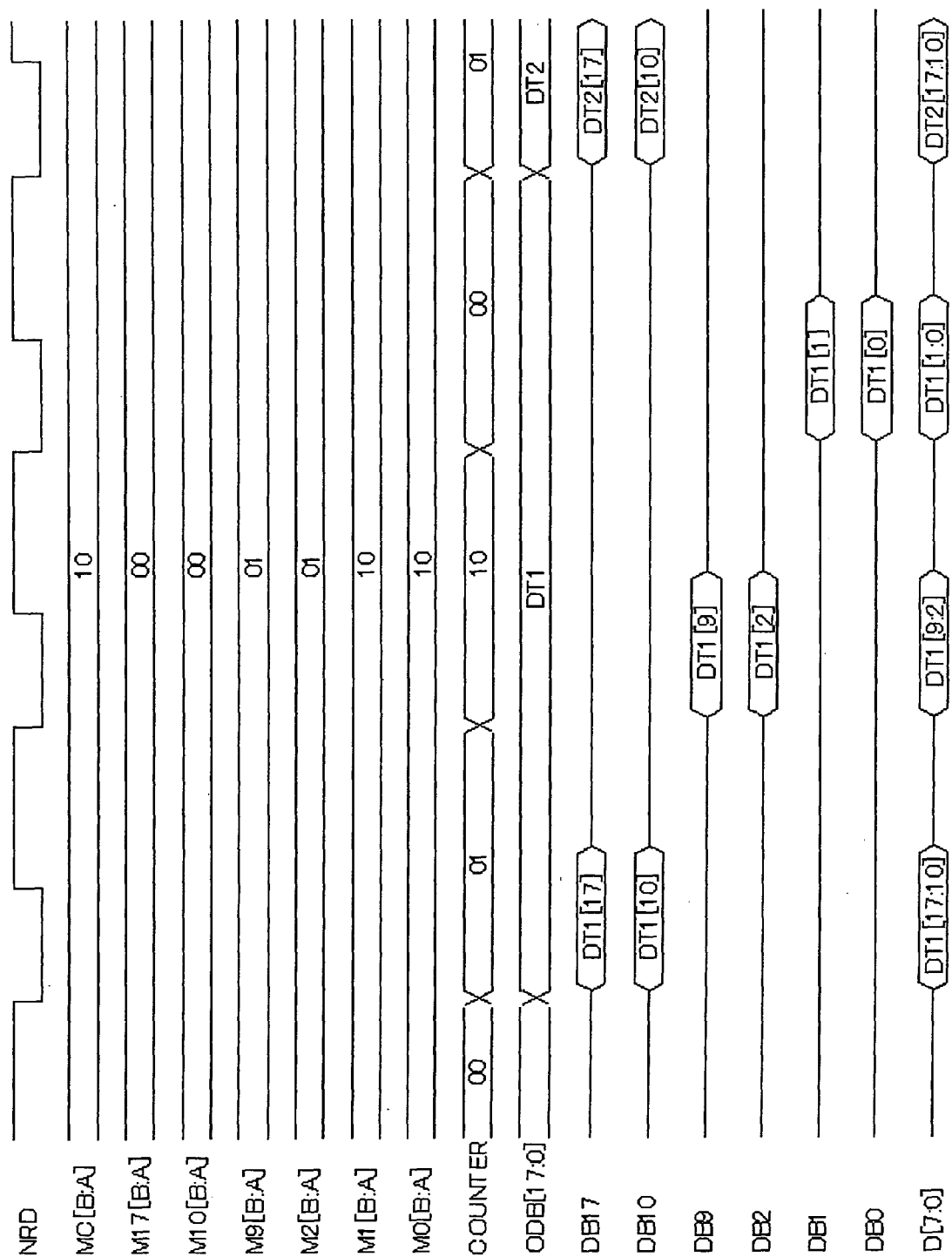

DATA BUS WIDTH CONVERSION APPARATUS AND DATA PROCESSING APPARATUS

BACKGROUND OF THE INVENTION

1. Field of the Invention

The present invention relates to a data bus conversion apparatus for use in various bus systems. More particularly, the present invention relates to a data bus width conversion apparatus which allows bus access between a CPU (host system) and its peripheral devices which have different data bus widths.

2. Description of the Related Art

When a CPU having a data bus width of M bits (M is a positive integer) tries to access an LSI (peripheral device) having a data bus width of N bits (N is a positive integer) which may be different from M, a data bus width conversion apparatus for resizing (changing) the data bus width is required. Note that M may be equal to N.

Japanese Laid-Open Publication No. 4-76890 discloses a conventional data bus width conversion apparatus comprising a memory cell array section for resizing a data bus width, in which the memory cell array section is used as a cache memory or a local memory (page 579, FIG. 1).

Japanese Laid-Open Publication No. 3-97340 (pages 256–257, FIGS. 1 and 2) and Japanese Laid-Open Publication No. 5-242016 (page 3, FIG. 1) disclose a conventional data bus width conversion apparatus comprising a latch circuit and an output control circuit between a data bus having a data bus width of M bits and a data bus having a data bus width of N bits in order to resize a data bus width.

However, in the above-described conventional data bus width conversion apparatuses, the number of access operations by a CPU required for transfer of N-bit data from the CPU to an LSI, the wiring pattern of connection between the CPU and the LSI, and the like, are fixed in hardware in order to resize a data bus width. Therefore, it is difficult to apply the conventional apparatuses to various bus systems.

For example, the data bus widths of conventional CPUs (host system) are set to a multiple of 8 bits (8 bits, 16 bits, 32 bits, etc.) in accordance with customary practice. However, a data bus width of 3 bits (18 bits, 24 bits, etc.) may be used in a number of display apparatuses, such as a liquid crystal module and the like. This is because display data for a display apparatus is composed of three color elements RED, GREEN and BLUE. If these three color elements have the same bit width, a data bus width has a multiple of 3 bits.

For example, it is assumed that a liquid crystal module having a data bus width of 18 bits is connected to a CPU having a data bus width of 8 bits. It is necessary to transfer all of 18-bit data from the CPU to the liquid crystal module in order to maximally exploit the display performance of the liquid crystal module. In this case, since the data bus width of the CPU is 8 bits, it is necessary to divide 18-bit data into at least three in order to transfer the data from the CPU to the liquid crystal module. For 18-bit data, there are various division patterns, such as 8-8-2, 6-6-6, 5-6-7, etc.

The minimum number of divisions for 18-bit data is three as described above. Alternatively, the number of divisions may be more than three (i.e., (the number of divisions)$\geq 3$) because of a particular CPU's structure, logic, or the like.

In conventional data bus width conversion apparatuses, the division pattern and the number of divisions of 18-bit data are fixed in hardware. Thus, when the above-described CPU interface is constructed by an LSI, the number of divisions and the division pattern are fixed in the LSI design. Therefore, the type of an LSI available for a CPU is limited and a CPU requires a software processing or the like.

SUMMARY OF THE INVENTION

According to an aspect of the present invention, a data bus width conversion apparatus is provided for receiving N-bit data (N is a positive integer) from a first device having a first bus width and outputting the N-bit data to a second device having a second bus width. The first device divides the N-bit data into a plurality of bit data groups and the plurality of bit data groups are transferred to the apparatus. The apparatus comprises: a setting section for setting the total number of transfer operations required for the first device to transfer the plurality of bit data groups, and for setting a division pattern of the N-bit data for dividing the N-bit data into the plurality of bit data groups; a receiving section for receiving data indicated by each of the plurality of bit data groups in accordance with the total number of transfer operations and the division pattern; and an output section for producing the N-bit data from the received data indicated by each of the plurality of bit data groups and outputting the produced N-bit data to the second device.

In one embodiment of this invention, the first device divides the N-bit data into the plurality of bit data groups in accordance with the total number of transfer operations and the division pattern set by the setting section.

In one embodiment of this invention, the setting section determines the total number of transfer operations and the division pattern in accordance with an instruction from the first device.

In one embodiment of this invention, the setting section determines the total number of transfer operations and the division pattern in accordance with the size of the first bus width.

In one embodiment of this invention, each of the plurality of bit data groups is transferred by the first device in a transfer operation having a prescribed ordinal number within the total number of transfer operations. The receiving section comprises: a counter section for counting the current number of transfer operations within the total number of transfer operations; a comparing section for comparing the current number of transfer operations with the ordinal number of a transfer operation for each of the plurality of bit data groups; and a sampling section for sampling the plurality of bit data groups in accordance with a result of the comparison.

In one embodiment of this invention, the counter section resets the number of counts to an initial value after the current ordinal number of a transfer operation reaches the total number of transfer operations.

In one embodiment of this invention, the setting section comprises: a first register for setting the total number of transfer operations; and a second register for setting the division pattern.

In one embodiment of this invention, the apparatus outputs the N-bit data to the second device in data write access from the first device to the second device.

In one embodiment of this invention, the apparatus outputs the N-bit data to the second device in bi-directional data transfer access between the first device and the second device.

According to another aspect of the present invention, a data bus width conversion apparatus is provided for dividing N-bit data (N is a positive integer) output from a second device having a second bus width into a plurality of bit data groups and transferring the plurality of bit data groups to a first device having a first bus width. The apparatus comprises: a setting section for setting the total number of transfer operations required for transferring the plurality of bit data groups to the first device, and for setting a division pattern of the N-bit data for dividing the N-bit data into the plurality of bit data groups; and a dividing section for dividing the N-bit data into the plurality of bit data groups in accordance with the total number of transfer operations and the division pattern.

In one embodiment of this invention, the apparatus outputs the plurality of bit data groups to the first device in data read access from the second device to the first device.

In one embodiment of this invention, the apparatus outputs the plurality of bit data groups to the first device in bi-directional data transfer access between the first device and the second device.

According to another aspect of the present invention, a data processing apparatus is provided, which comprises: a data bus width conversion apparatus for receiving N-bit data (N is a positive integer) from a first device having a first bus width and outputting the N-bit data, wherein the first device divides the N-bit data into a plurality of bit data groups and the plurality of bit data groups are transferred to the data bus width conversion apparatus; and a second device having a second bus width for receiving the N-bit data output from the data bus width conversion apparatus. The data bus width conversion apparatus comprises: a setting section for setting the total number of transfer operations required for the first device to transfer the plurality of bit data groups, and for setting a division pattern of the N-bit data for dividing the N-bit data into the plurality of bit data groups; a receiving section for receiving data indicated by each of the plurality of bit data groups in accordance with the total number of transfer operations and the division pattern; and an output section for producing the N-bit data from the received data indicated by each of the plurality of bit data groups and outputting the produced N-bit data to the second device.

In one embodiment of this invention, the data processing apparatus is a display apparatus.

According to another aspect of the present invention, a data processing apparatus is provided, which comprises: a second device having a second bus width for outputting N-bit data (N is a positive integer); and a data bus width conversion apparatus for dividing the N-bit data output from the second device into a plurality of bit data groups and transferring the plurality of bit data groups to a first device having a first bus width. The data bus width conversion apparatus comprises: a setting section for setting the total number of transfer operations required for transferring the plurality of bit data groups to the first device, and for setting a division pattern of the N-bit data for dividing the N-bit data into the plurality of bit data groups; and a dividing section for dividing the N-bit data into the plurality of bit data groups in accordance with the total number of transfer operations and the division pattern.

In one embodiment of this invention, the data processing apparatus is a display apparatus.

Functions of the present invention will be described below.

The data bus width conversion apparatus of the present invention comprises a setting section in which the total number of transfer operations is set where a CPU (host system) divides N-bit data (N is a positive integer) into a plurality of bit data groups, and a division pattern of the N-bit data for dividing the N-bit data into a plurality of bit data groups. Alternatively, the data bus width conversion apparatus of the present invention comprises a setting section in which the total number of transfer operations is set where N-bit data is divided into a plurality of bit data groups which are in turn transferred to a CPU, and a division pattern of the N-bit data for dividing the N-bit data into a plurality of bit data groups. Therefore, the number of divisions and a division pattern of data can be arbitrarily determined without hardware limitation when data write access is carried out from a CPU (host system) to an LSI (peripheral device) and when data read access is carried out from an LSI (peripheral device) to a CPU (host system).

Thus, the invention described herein makes possible the advantage of providing a data bus width conversion apparatus in which when data write access and data read access are performed from a CPU (host system) to an LSI (peripheral device), the number of divisions and the division pattern can be arbitrarily set.

These and other advantages of the present invention will become apparent to those skilled in the art upon reading and understanding the following detailed description with reference to the accompanying figures.

BRIEF DESCRIPTION OF THE DRAWINGS

FIG. 5B is a diagram showing a data processing apparatus according to an embodiment of the present invention.

FIG. 8 is a timing chart of signals in a data bus width conversion apparatus of the present invention in data read access.

DESCRIPTION OF THE PREFERRED EMBODIMENTS

Hereinafter, the present invention will be described by way of illustrative examples with reference to the accompanying drawings.

Embodiment 1

Figure 1A:
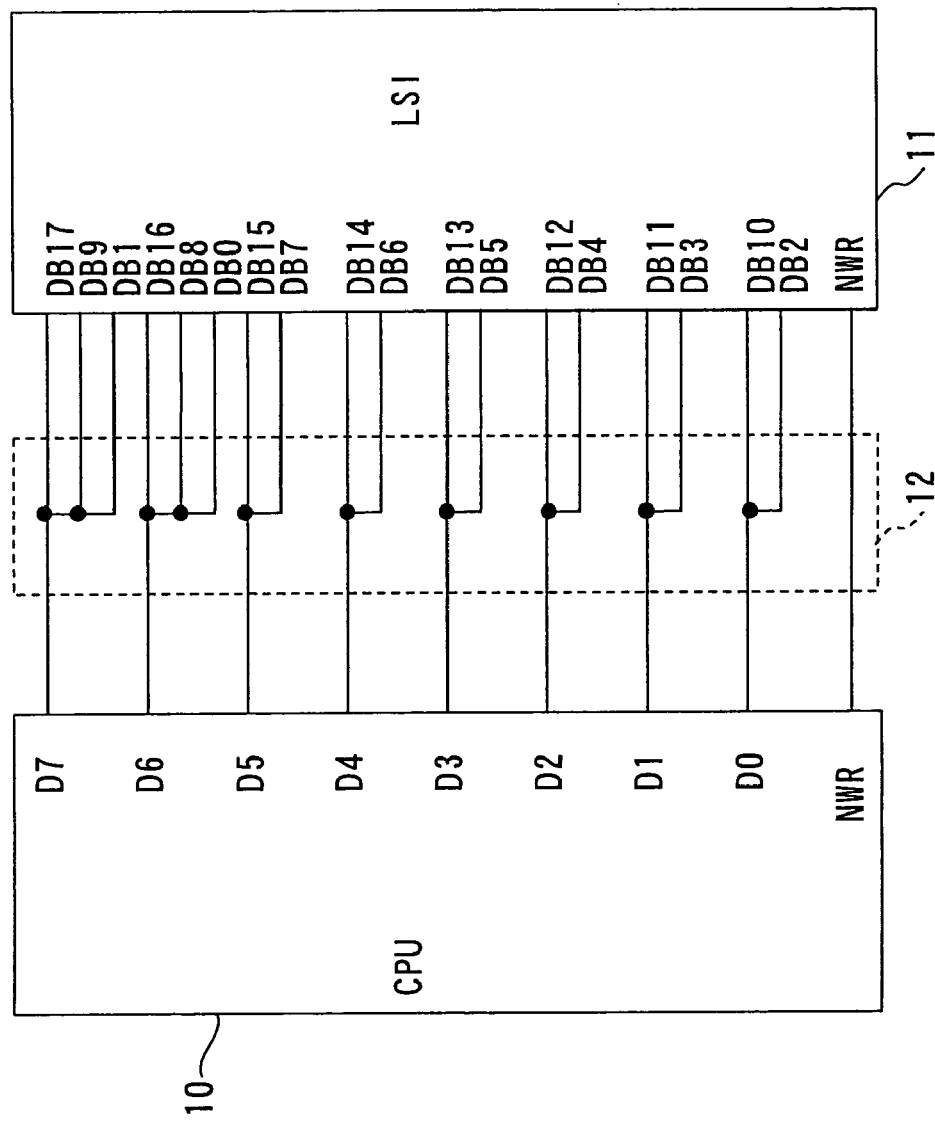
FIG. 1A is a diagram of a data processing system according to an embodiment of the present invention, showing a wiring state of connection lines between an interface section of a CPU and an interface section of an LSI.

FIG. 1A shows a data processing system 100 according to Embodiment 1 of the present invention.

Figure 2:
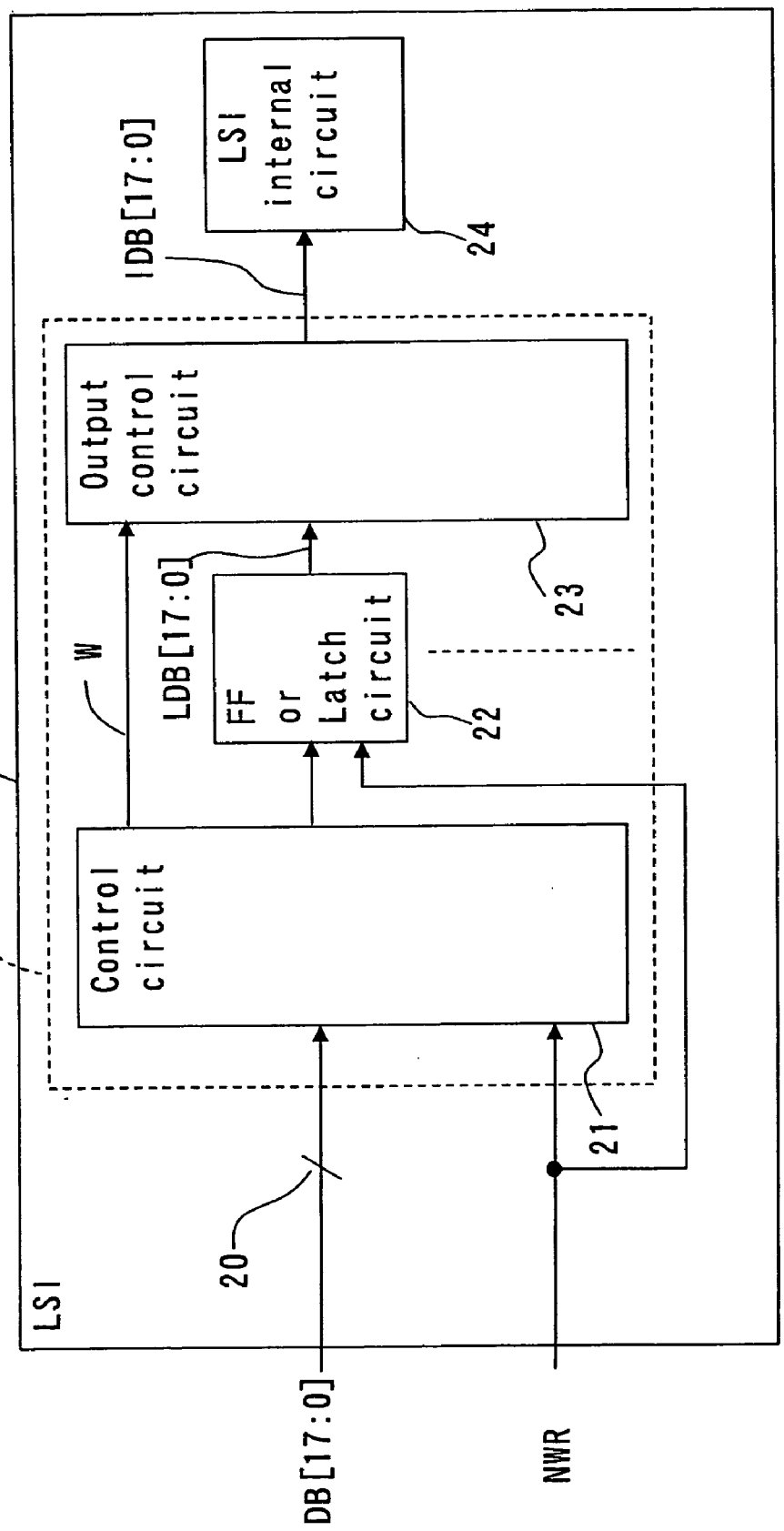
FIG. 2 is a diagram showing a data bus width conversion apparatus according to an embodiment of the present invention, which resizes or changes the width of a data bus in the interface section of the LSI of FIG. 1A.

The data processing system 100 comprises a CPU 10 and an LSI 11. The LSI 11 comprises a data bus width conversion apparatus 120 (FIG. 2).

The CPU 10 is contained in a host system, such as a personal computer or the like. The LSI 11 is contained in a peripheral device for controlling a display apparatus, such as a liquid crystal module or the like. The CPU 10 has a data bus width of 8 bits. The LSI 11 has a data bus width of 18 bits. The CPU 10 is connected to the LSI 11 via a connection line section 12.

In the connection line section 12, data bus terminals D0 to D7 and a data write signal NWR terminal, which constitute an interface section of the CPU 10, are connected to data bus terminals DB0 to DB17 and a data write signal NWR terminal, which constitute an interface section of the LSI 11.

Specifically, in the connection line section 12, the data bus terminal D7 of the CPU 10 is connected to the data bus terminals DB17, DB9, and DB1 of the LSI 11. Similarly, the data bus terminal D6 of the CPU 10 is connected to the data bus terminals DB16, DB8, and DB0 of the LSI 11. The data bus terminal D5 of the CPU 10 is connected to the data bus terminals DB15 and DB7 of the LSI 11. The data bus terminal D4 of the CPU 10 is connected to the data bus terminals DB14 and DB6 of the LSI 11. The data bus terminal D3 of the CPU 10 is connected to the data bus terminals DB13 and DB5 of the LSI 11. The data bus terminal D2 of the CPU 10 is connected to the data bus terminals DB12 and DB4 of the LSI 11. The data bus terminal D1 of the CPU 10 is connected to the data bus terminals DB11 and DB3 of the LSI 11. The data bus terminal D0 of the CPU 10 is connected to the data bus terminals DB10 and DB2 of the LSI 11. The data write signal NWR terminal of the CPU 10 is connected to the data write signal NWR terminal of the LSI 11.

As shown in FIG. 1A, the interface section of the CPU 10 having a data bus width of 8 bits is connected to the interface section of the LSI 11 having a data bus width of 18 bits. In this case, 18-bit data is divided into three groups (divisional bit data groups). 18-bit data is transferred on a divisional bit data group-by-divisional bit data group basis. For example, 18-bit data is divided as follows. The 8-bit data from the 17th data input through the terminal DB17 to the 10th data input through the terminal DB10 constitute a first divisional bit data group. The 8-bit data from the 9th data input through the terminal DB9 to the 2nd data input through the terminal DB2 constitute a second divisional bit data group. The 2-bit data including the 1st data input through the terminal DB1 to the 0th data input through the terminal DB0 constitute a third divisional bit data group. This division pattern is designated 8-8-2.

Figure 1B:
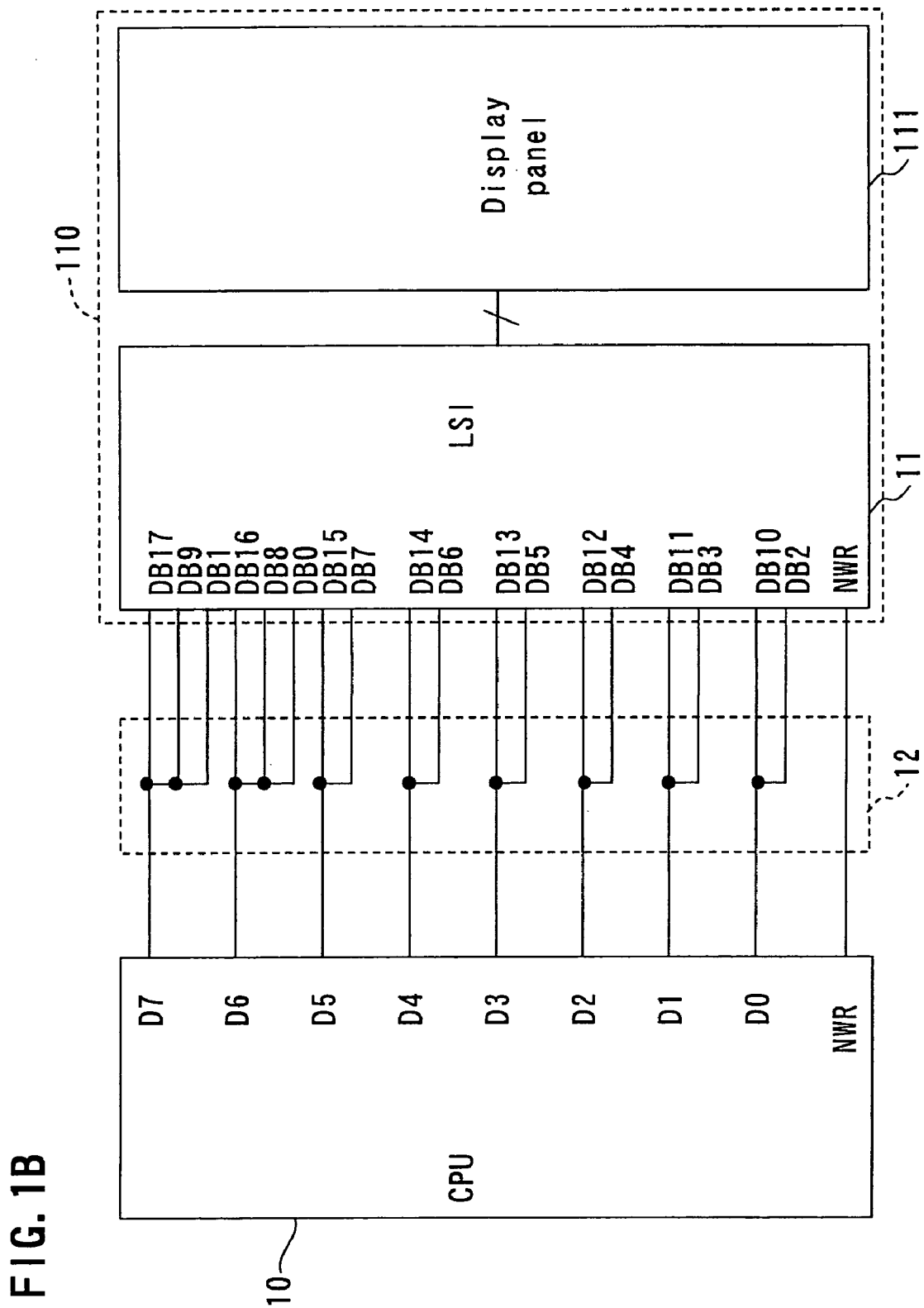
FIG. 1B is a diagram showing a data processing apparatus according to an embodiment of the present invention.

FIG. 1B shows a display apparatus 110 as an exemplary data processing apparatus of the present invention. The display apparatus 110 may be a liquid crystal display apparatus, for example. The display apparatus 110 comprises the LSI 11 of FIG. 1A and a display panel 111. In this case, the LSI 11 controls the display performance of the display panel 111. In this manner, the LSI 11 comprising the data bus width conversion apparatus 120 may be mounted in various data processing apparatuses.

FIG. 2 shows the data bus width conversion apparatus 120 according to Embodiment 1 of the present invention, which is included in the LSI 11 of FIG. 1A. The data bus width conversion apparatus 120 resizes or changes the 8-bit data bus width of the CPU 10 to the 18-bit data bus width of the LSI 11.

The data bus width conversion apparatus 120 comprises a control circuit 21 for resizing data output from a data bus 20 having a data bus width of 18 bits connected to the CPU 10, a flip-flop (FF) 22 for bit information, and an output control circuit 23 for outputting 18-bit width data resized by the control circuit 21 into the LSI 11. An LSI internal circuit 24 receives data output from the output control circuit 23. The flip-flop 22 may be a latch circuit.

Figure 3:
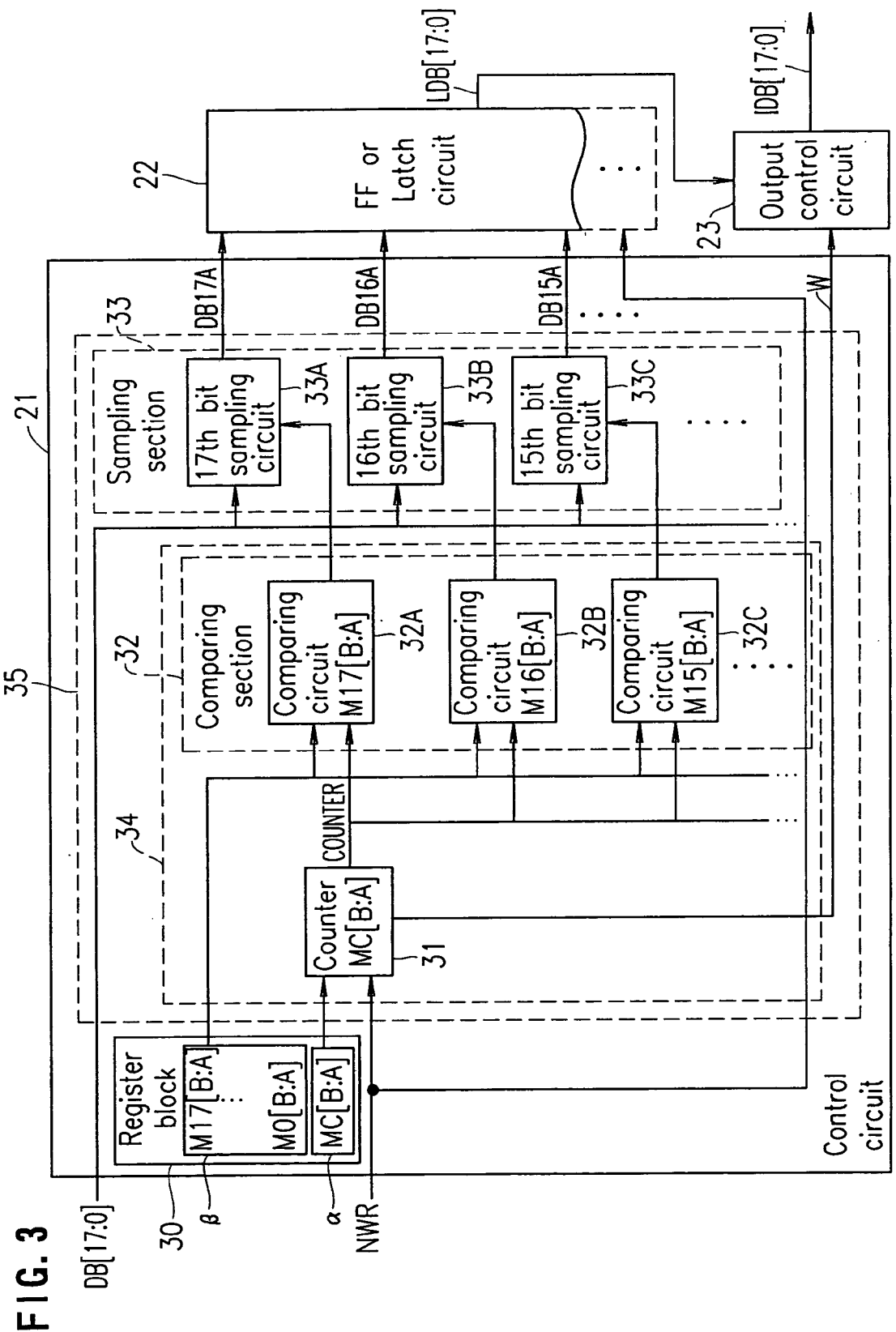
FIG. 3 is a block diagram showing a structure of a control circuit contained in the data bus width conversion apparatus of FIG. 2.

FIG. 3 is a block diagram showing a detail of the control circuit 21 of FIG. 2.

As shown in FIG. 3, the control circuit 21 comprises a register block 30. The register block 30 comprises a register α for arbitrarily setting the total number of data write access operations from the CPU 10 to the LSI 11 in sampling the 18-bit width data (the total number of transfer operations of a plurality of divisional bit data groups from the CPU 10 to the LSI 11) and a register β for setting the ordinal number of a data transfer operation for each data bit of 18-bit width data (i.e., a division pattern of 18-bit width data for dividing data bits of 18-bit width data into a plurality of divisional bit data groups).

The control circuit 21 comprises a receiving section 35 for receiving data represented by each of the bit data groups based on the total number of transfer operations and the division pattern set in the register α and the register β, respectively. The receiving section 35 comprises a sampling section 33 and a sampling control signal generating section 34. The sampling control signal generating section 34 comprises a counter 31 and a comparing section 32. The counter 31 counts the current number of transfer operations where the maximum number of counts is the total number of transfer operations set in the register α. The comparing section 32 compares the current count number of transfer operations with the ordinal number of a transfer operation defined for each bit data group. The comparing section 32 outputs to the sampling section 33 a sampling control signal for sampling data included in a bit data group, whose ordinal number of a transfer operation is identical to the current number of transfer operations. The counter 31 may be either incremented or decremented.

The counter 31 outputs a count value, i.e., the number of transfer operations (the number of data write strobe operations), in synchronization with a data write signal NWR output from the CPU 10. The comparing section 32 comprises a plurality of comparing circuits for comparing a value registered in the register β with a count value of the counter 31. A comparing circuit is provided for each bit of 18-bit width data. Values registered in the register β are defined based on the above-described division pattern. A registered value indicating the ordinal number of a transfer operation is input to each comparing circuit. The registered value varies depending on the corresponding bit data group. In Embodiment 1, the comparing section 32 comprises 18 comparing circuits (FIG. 3 shows three comparing circuits 32A, 32B, and 32C of the 18 comparing circuits for the sake of simplicity).

The sampling section 33 comprises a plurality of sampling circuits for sampling an 18-bit width data bus signal DB[17:0] in accordance with a sampling control signal for each divisional bit data group. A sampling circuit is provided for each bit of 18-bit width data. In Embodiment 1, the sampling section 33 comprises 18 sampling circuits (FIG. 3 shows three sampling circuits 33A, 33B, and 33C of the 18 sampling circuits). The 18 sampling circuits receive sampling signals output from the respective corresponding comparing circuits. The 18 sampling circuits sample the respective data bits of 18-bit width data in accordance with the respective sampling signals.

Next, the sampling section 33 outputs a data bus signal DB[17:0] containing data bits via the flip-flop 22 to the output control circuit 23. In addition, the counter 31 outputs a data write signal W to the output control circuit 23. The output control circuit 23 joins data of the divisional bit data groups in synchronization with the data write signal W to form continuous 18-bit width data and transfers the resultant data to the LSI internal circuit 24.

The flip-flop 22 may be integrated with the sampling section 33. In this case, the flip-flop 22 functions in the same manner as when not integrated.

Next, an exemplary structure of the register α and the register β of FIG. 3 provided in the register block 30 of the control circuit 21 is shown in Table 1. The register α comprises registers MCB and MCA. The register β comprises registers M0B to M17B and M0A to M17A. In Table 1, MWB0 to MWB5 each represent an 8-bit register block.

The ordinal number of each bit of an 18-bit width data bus signal is represented by 2 bits in the register β, and the total number of transfer operations required for transfer of all 18-bit width data is represented by 2 bits in the register α. In Table 1, the registers MCB and MCA correspond to bit1 and bit0 of MWB0, respectively, and the registers M0B to M17B and M0A to M17A sequentially correspond to bit0 of MWB1 to bit3 of MWB5. In Table 1, X represents "don't care" indicating a bit which has no influence on the data transfer operation.

The registers MCB and MCA specify the total number of data write strobe operations required for sampling all bits of an 18-bit width data bus signal when a host interface within an LSI samples, for example, an 18-bit width data bus signal on a data bus. The signal levels of data bits of an 18-bit width data bus signal are sampled on a divisional bit data group-by-divisional bit data group basis in accordance with the total number of a data write strobe operation specified by the registers M*B and M*A.

Table 3 shows an exemplary set of values registered in the register α and the register β of Table 2. Here, 18-bit width data is divided into three, where the division pattern is 8(17th bit to 10th bit)-8(9th bit to 2nd bit)-2(1st bit and 0th bit) in order to convert 8-bit width data of the CPU 10 to 18-bit width data of the LSI 11. Thus, each divisional bit data group corresponds to 8 bit width data or 2-bit width data.

In this case, the total number of data write access operations to 8 bit width data of the CPU 10 required for sampling 18-bit width data is three. Therefore, the values set by the registers MCB and MCA in the register α are M*B=1 and

TABLE 1

| NAME | bit 7 | bit 6 | bit 5 | bit 4 | bit 3 | bit 2 | bit 1 | bit 0 |
|---|---|---|---|---|---|---|---|---|
| MWB0 | X | X | X | X | X | X | MCB | MCA |
| MWB1 | M3B | M3A | M2B | M2A | M1B | M1A | M0B | M0A |
| MWB2 | M7B | M7A | M6B | M6A | M5B | M5A | M4B | M4A |
| MWB3 | M11B | M11A | M10B | M10A | M9B | M9A | M8B | M8A |
| MWB4 | M15B | M15A | M14B | M14A | M13B | M13A | M12B | M12A |
| MWB5 | X | X | X | X | M17B | M17A | M16B | M16A |

In Table 1, the 8-bit registers MWB1 to MWB5 contains the registers M*B and M*A where * represents a number from 0 to 17. The number refers to a register (register β) corresponding to each bit of the 18-bit data bus. A value set by the registers M*B and M*A indicates the ordinal number of a data write strobe operation which samples the corresponding bit of a data bus signal on the 18-bit data bus.

Table 2 shows values set by the registers M*B and M*A and sampling timings for an 18-bit width data bus signal.

When M*B=M*A=0, the *th bit is sampled in a first data write strobe operation. When M*B=0 and M*A=1, the *th bit is sampled in a second data write strobe operation. When M*B=1 and M*A=0, the *th bit is sampled in a third data write strobe operation. When M*B=1 and M*A=1, the *th bit is sampled in a fourth data write strobe operation.

The registers MCB and MCA corresponding to bit1 and bit0 of MWB0 indicate the total number of data write access operations (the total number of transfer operations) required for sampling all data of a data bus signal having a prescribed N-bit width (in Embodiment 1, 18-bit width). Values set by the registers MCB and MCA and the total number of data write access operations are defined under the same rule as shown in Table 2 for the values set by the registers M*B and M*A and the ordinal number of a data write access.

TABLE 2

| M*B | M*A | Sampling |
|---|---|---|
| 0 | 0 | 1 |
| 0 | 1 | 2 |
| 1 | 0 | 3 |
| 1 | 1 | 4 |

M*A=0 (*=C) according to Table 2. The set values MCB=1 and MCA=0 are set in bit1 and bit0 of MWB0 in Table 3, respectively.

When data of the 17th bit to the 10th bit is defined as a data sequence (divisional bit data group) to be sampled in the first data write strobe operation, the registers M17B to M10B and M17A to M10A in the register β have values M*B=M*A=0 (*=10 to 17) according to Table 2. In this case, the values set by the registers (M17B, M17A) to (M10B, M10A) are set in bit3 and bit2 of MWB5 to bit5 and bit4 of MWB3 in sequence according to Table 3.

When data of the 9th bit to the 2nd bit is defined as a data sequence (divisional bit data group) to be sampled in the second data write strobe operation, the registers M9B to M2B and M9A to M2A in the register β have values M*B=0 and M*A=1 (*=2 to 9) according to Table 2. In this case, the values set by the registers (M9B, M9A) to (M2B, M2A) are set in bit3 and bit2 of MWB3 to bit5 and bit4 of MWB1 in sequence according to Table 3.

When data of the 1st bit and the 0th bit is defined as a data sequence (divisional bit data group) to be sampled in the third data write strobe operation, the registers M1B, M0B and M1A, M0A in the register β have values M*B=1 and M*A=0 (*=0, 1) according to Table 2. In this case, the values set by the registers (M1B, M1A) and (M0B, M0A) are set in bit3 and bit2 of MWB1 and bit1 and bit0 of MWB1 in sequence according to Table 3.

As shown in Table 3, in Embodiment 1, since the registers MCB and MCA are MCB=1 and MCA=0, one data write cycle for an 18-bit width data bus signal is completed by a total of three data write strobe operations according to Table 2.

TABLE 3

| NAME | bit 7 | bit 6 | bit 5 | bit 4 | bit 3 | bit 2 | bit 1 | bit 0 |
|------|-------|-------|-------|-------|-------|-------|-------|-------|
| MWB0 | X | X | X | X | X | X | 1 | 0 |
| MWB1 | 0 | 1 | 0 | 1 | 1 | 0 | 1 | 0 |
| MWB2 | 0 | 1 | 0 | 1 | 0 | 1 | 0 | 1 |
| MWB3 | 0 | 0 | 0 | 0 | 0 | 1 | 0 | 1 |
| MWB4 | 0 | 0 | 0 | 0 | 0 | 0 | 0 | 0 |
| MWB5 | X | X | X | X | 0 | 0 | 0 | 0 |

Next, an operation of a data bus width conversion apparatus of the present invention when values are set in the registers α and β as shown in Table 3, will be described with reference to FIGS. 1A, 2 and 3.

As described above, in Embodiment 1, the CPU 10 having a data bus width of 8 bits is connected with the LSI 11 having a data bus width of 18 bits (FIG. 1A) using a division pattern of 8-8-2.

The CPU 10 outputs 8-bit data, which is in turn input to the 18-bit width data bus 20 (FIG. 2). The CPU10 outputs signals DT1-0, DT1-1, and DT1-2 (8-bit data) indicating the three divisional bit data groups in accordance with a division pattern, such as 8-8-2. In the signal DT1-2, 2 data bits of the 8-bit data are valid while the other 6 data bits are "don't care" and do not have an influence on a data transfer operation. The signals DT1-0, DT1-1, and DT1-2 are input via the 18-bit width data bus 20 to the control circuit 21 in synchronization with the data write signal NWR.

The data write signal NWR is input to the counter 31 within the control circuit 21 (FIG. 3). The counter 31 counts the number of data write strobe operations in synchronization with the data write signal NWR. In addition, the register β sets the ordinal number of a data write access operation by the CPU 10 for sampling a specific bit of 18-bit width data in a data bus signal.

The register α outputs a registered value indicating the total number of data write strobe operations (the total number of transfer operations) to the counter 31. The counter 31 counts the number of data write strobe operations in accordance with the data write signal NWR and outputs the resultant counter value to the comparing section 32.

The 18 comparing circuits contained in the comparing section 32 each compare a value registered in the register β indicating the ordinal number of a data write strobe operation with a counter value indicating the number of data write strobe operations counted by the counter 31. Each comparing circuit, in which the registered value is identical to the counter value, outputs a sampling control signal to a sampling circuit corresponding to the comparing circuit.

The sampling section 33 receives the 18-bit width data bus signal DB[17:0]. The 18 data bits of the data bus signal DB[17:0] are input to the respective sampling circuits.

A sampling circuit, which has received a sampling control signal, samples the corresponding data bit of the data bus signal DB[17:0] in accordance with the received sampling control signal and outputs the sampled data bit to the flip-flop 22. For example, in the case of the 17th bit sampling circuit 33A of the sampling section 33, since the values set by the register β are M17B=M17A=0 according to Tables 2 and 3, a data bit DB17A input through the terminal DB17 in the first data write strobe operation is sampled and output by the 17th bit sampling circuit 33A to the flip-flop 22 during one data write cycle.

The flip-flop 22 accumulates data bits of the data bus signal DB[17:0] on a divisional bit data group-by-divisional bit data group basis and outputs the data bits as a data bus signal LDB[17:0] to the output control circuit 23 in accordance with the data write signal NWR.

The flip-flop 22 may be integrated with the sampling section 33. In this case, the flip-flop 22 functions in the same manner as when not integrated. In this case, when a sampling circuit of the sampling section 33 which has received a sampling control signal from the comparing section 32 samples the corresponding bit of a data bus signal DB[17:0] in accordance with the received sampling control signal, a flip-flop (or a latch circuit) is employed to perform the sampling operation in synchronization with the data write signal NWR and the sampled data bus signal is output directly to the output control circuit 23.

The counter 31 increments (or decrements) the number of data write strobe operations every time the data write signal NWR is input. When the counter value reaches the value registered in the registers MCB and MCA (in Embodiment 1, "10" since the total number of data write access operations is three), the counter value is reset to an initial value (in Embodiment 1, "00"). In addition, the counter 31 outputs to output control circuit 23 a data write signal W for outputting the resized 18-bit width data to the LSI internal circuit 24.

Data sampled from all of the divisional bit data groups by a total of three data write access operations is output as continuous 18-bit width data IDB[17:0] in accordance with the data write signal W and is written into a register, a memory, or the like contained in the LSI internal circuit 24 of the LSI 11.

Thus, the data bus width conversion apparatus 120 of the present invention comprises the register α in which the total number of data write access operations by the CPU 10 required for the control circuit 21 to sample N-bit width data is set, and the register β in which the ordinal number of a data write access operation which samples a specific bit of the N-bit width data is set. Thus, when the CPU 10 having an M-bit width data bus accesses the LSI 11 (peripheral device) having an N-bit width data bus (including M=N), the total number of data write access operations (the total number of transfer operations) by the CPU 10 and a division pattern are not fixed in hardware and data bus width can be arbitrarily resized for various bus systems.

Figure 4:
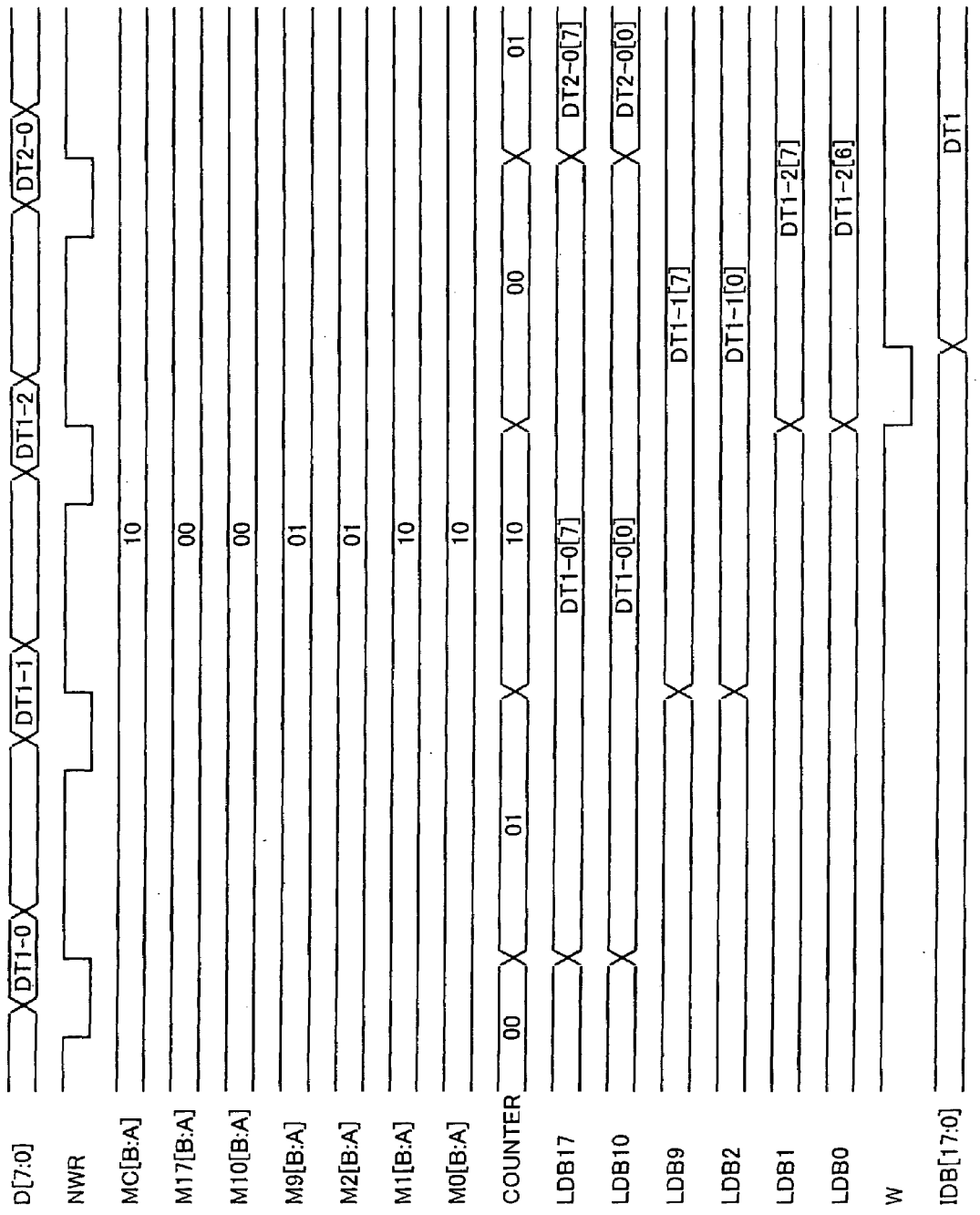
FIG. 4 is a timing chart of signals in a data bus width conversion apparatus of the present invention.

FIG. 4 is a timing chart of signals in a data bus width conversion apparatus of the present invention.

The CPU 10 outputs an 8-bit data bus signal D[7:0] via the connection line section 12 to the 18-bit width data bus 20 of the LSI 11 in synchronization with the data write signal NWR. The data bus signal D[7:0] is output as, for example, a data signal DT1-0 corresponding to the 17th bit to the 10th bit of 18-bit data bus width in the LSI 11, a data signal DT1-1 corresponding to the 9th bit to the 2nd bit of the data bus width in the LSI 11, or a data signal DT1-2 corresponding to the 1st bit and the 0th bit of the data bus width in the LSI 11. Note that when the data signal DT1-2 corresponding to the 1st bit and the 0th bit of the data bus width in the LSI 11 is transferred, only 2 bits are used in the 8-bit bus width.

Next, the data signals DT1-0, DT1-1, and DT1-2 are input from the 18-bit width data bus 20 to the sampling section 33 of the control circuit 21.

In the control circuit 21, the register α and the register β in the register block 30 store conditions for sampling the data signal DT1-0, DT1-1, and DT1-2. Specifically, MC[B:A]=10 indicates that a total of three data write strobe operations are required for sampling an entire 18-bit width data bus signal. M17[B:A]=00 to M10[B:A]=00 indicate that the data signal DT1-0 is sampled into the 17th bit to the 10th bit in the first data write strobe operation. M9[B:A]=01 to M2[B:A]=01 indicate that the data signal DT1-1 is sampled into the 9th bit to the 2nd bit in the second data write strobe operation. M1[B:A]=10 and M0[B:A]=10 indicate that the data signal DT1-2 is sampled into the 1st bit and the 0th bit in the third data write strobe operation.

Next, the ordinal number of a data write strobe operation corresponding to the data signal DT1-0, DT1-1, or DT1-2 is a counter value 00, 01, or 10 indicated by the counter 31, respectively. When a counter value is identical to a value registered in the register β, the corresponding data signal DT1-0, DT1-1, or DT1-2 is sampled by the appropriate sampling circuit(s).

For example, the data signal DT1-0 is sampled as data DT1-0[7] to data DT1-0[0]. The data DT1-0[7] to the data DT1-0[0] are output via the corresponding output terminals of the sampling section 33 to the flip-flop 22. Similarly, the data signal DT1-1 is sampled as data DT1-1[7] to data DT1-1[0] and output via the corresponding output terminals of the sampling section 33 to the flip-flop 22. The data signal DT1-2 is sampled as data DT1-2[7] to data DT1-2[6] and output via the corresponding output terminals of the sampling section 33 to the flip-flop 22. Here, for example, the above-described [7] to [0] correspond to the 7th bit to the 0th bit of 8-bit data output via the D7 to D0 terminals of the CPU 10.

Next, the flip-flop 22 outputs the data DT1-0[7] to DT1-0[0], the data DT1-1[7] to DT1-1[0], and the data DT1-2[7] to data DT1-2[6] as latch data LDB[17:0] to the output control circuit 23 in synchronization with the data write signal NWR.

The output control circuit 23 resizes the divisional bit data groups, i.e., the data DT1-0[7] to DT1-0[0], the data DT1-1[7] to DT1-1[0], and the data DT1-2[7] to DT1-2[6] into data DT1 which is a continuous 18-bit width data bus signal IDB[17:0] and outputs the data DT1 to the LSI internal circuit 24 in synchronization with the data write signal W output from the counter 31.

In Embodiment 1, the total number of transfer operations and the ordinal number of a transfer operation are represented by 2 bits in the register α and the register β. However, by changing the bit width of the register α and the register β, the total number of transfer operations by a CPU when an N-bit width data bus signal is sampled (e.g., C times) and the ordinal number of a data write access operation which samples a specific bit of the N-bit width data, can be freely determined.

Note that the total number of transfer operations and a division pattern may be set in the register α and the register β in accordance with an instruction from the CPU 10. Alternatively, the total number of transfer operations and a division pattern may be set in the register α and the register β in accordance with the data bus width (and the wiring manner of connection lines) of the CPU 10 recognized by the register block 30. In this case, the CPU 10 divides and outputs data in accordance with the total number of transfer operations and a division pattern set by the register block 30.

Thus, even when a CPU having an M-bit data bus width is connected to a peripheral device having an N-bit data bus width, the wiring manner of connection lines between the CPU and the peripheral device can be freely determined without hardware limitation.

Embodiment 1 shows an example of data bus width conversion when a CPU undergoes data write access. However, by utilizing the reverse sequence of the above-described data bus width conversion in the data write access, N-bit width data can be divided into M-bit width data when data read access is performed from a peripheral device to a CPU.

Embodiment 2

Hereinafter, Embodiment 2 of the present invention in which data read access is performed from an LSI (peripheral device) to a CPU (host system) will be described with reference to FIGS. 5A, 5B and 6 to 8.

Figure 5A:
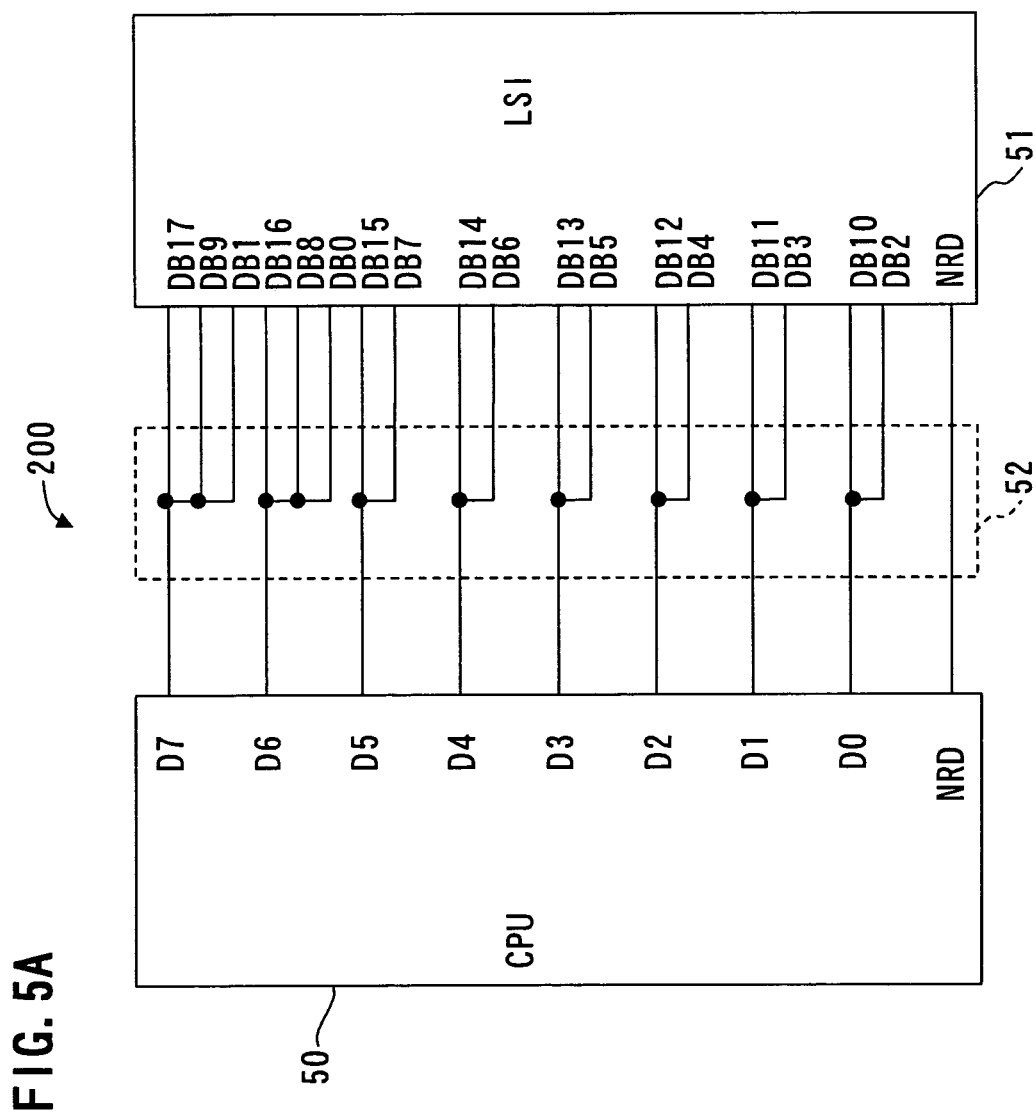
FIG. 5A is a diagram of a data processing system according to an embodiment of the present invention, showing a wiring state of connection lines between an interface section of a CPU and an interface section of an LSI, where data read access is carried out.

FIG. 5A shows a data processing system 200 according to Embodiment 2 of the present invention.

Figure 6:
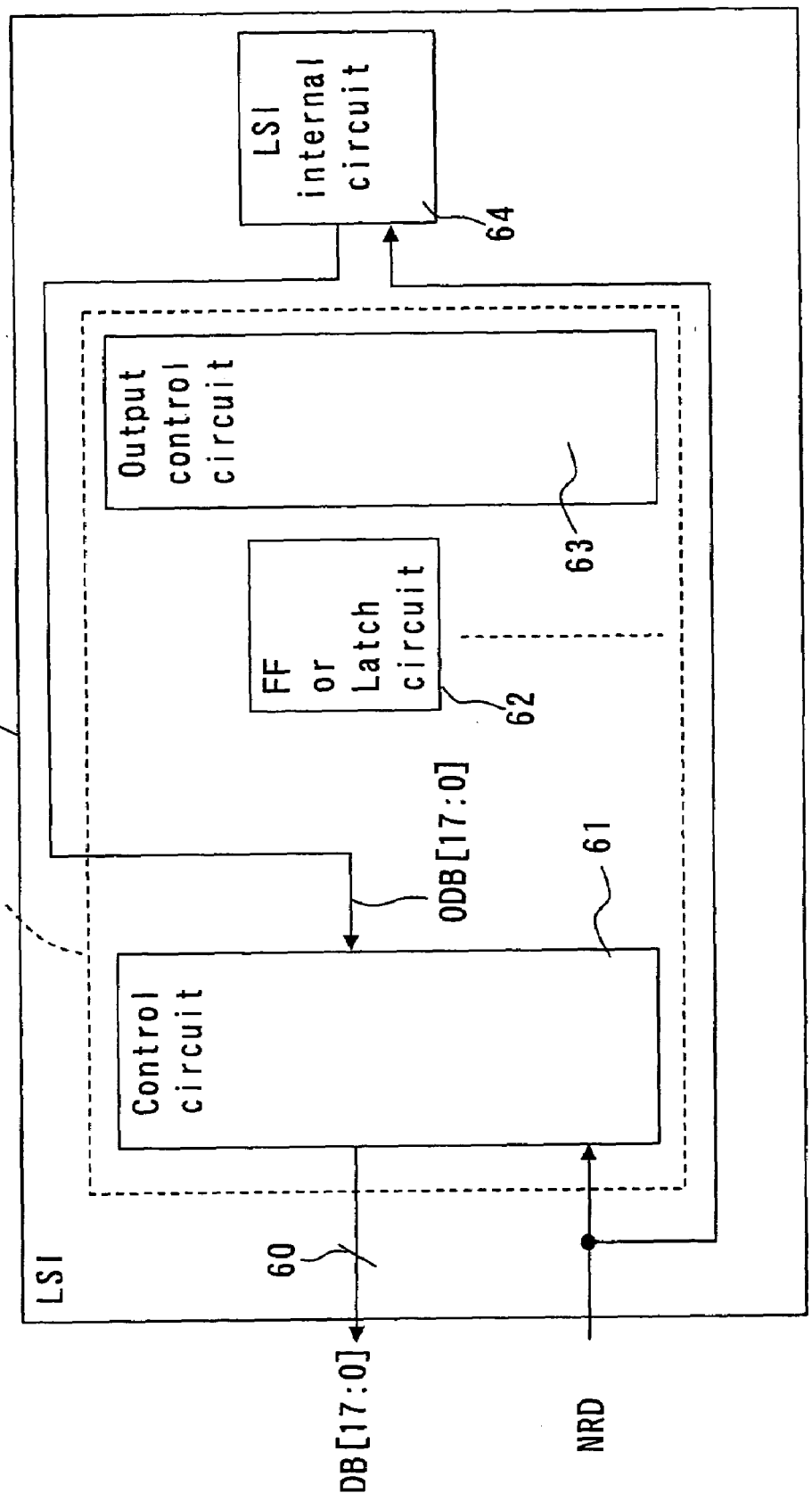
FIG. 6 is a diagram showing a data bus width conversion apparatus according to an embodiment of the present invention, which resizes or changes the width of a data bus in the interface section of the LSI of FIG. 1A in data read access.

The data processing system 200 comprises a CPU 50 and an LSI 51. The LSI 51 comprises a data bus width conversion apparatus 220 (FIG. 6).

In a connection line section 52, the CPU 50 and the LSI 51 are connected to each other in the same manner as in the CPU 10 and the LSI 11 of FIG. 1A. A data read signal NRD terminal of the CPU 50 is connected to a data read signal NRD terminal of the LSI 51.

As shown in FIG. 5A, an interface section of the CPU 50 having a data bus width of 8 bits is connected to an interface section of the LSI 51 having a data bus width of 18 bits with the same division pattern 8-8-2 as in FIG. 1A.

FIG. 5B shows a display apparatus 210 as an exemplary data processing apparatus of the present invention. The display apparatus 210 may be a liquid crystal display apparatus, for example. The display apparatus 210 comprises the LSI 51 of FIG. 5A and a display panel 211. In this case, the LSI 51 controls the display performance of the display panel 211. In this manner, the LSI 51 comprising the data bus width conversion apparatus 220 may be mounted in various data processing apparatuses.

FIG. 6 shows the data bus width conversion apparatus 220 according to Embodiment 2 of the present invention, which is included in the LSI 51 of FIG. 5A. The data bus width conversion apparatus 220 resizes the 18-bit data bus width of the LSI 51 to the 8-bit data bus width of the CPU 50 in data read access.

The data bus width conversion apparatus 220 of FIG. 6 has the same structure as that of the data bus width conversion apparatus 120 of FIG. 2, and can perform a data bus conversion operation of the present invention even when a flip-flop (FF) 62 and an output control circuit 63 are not used. The flip-flop 62 may be a latch circuit.

Figure 7:
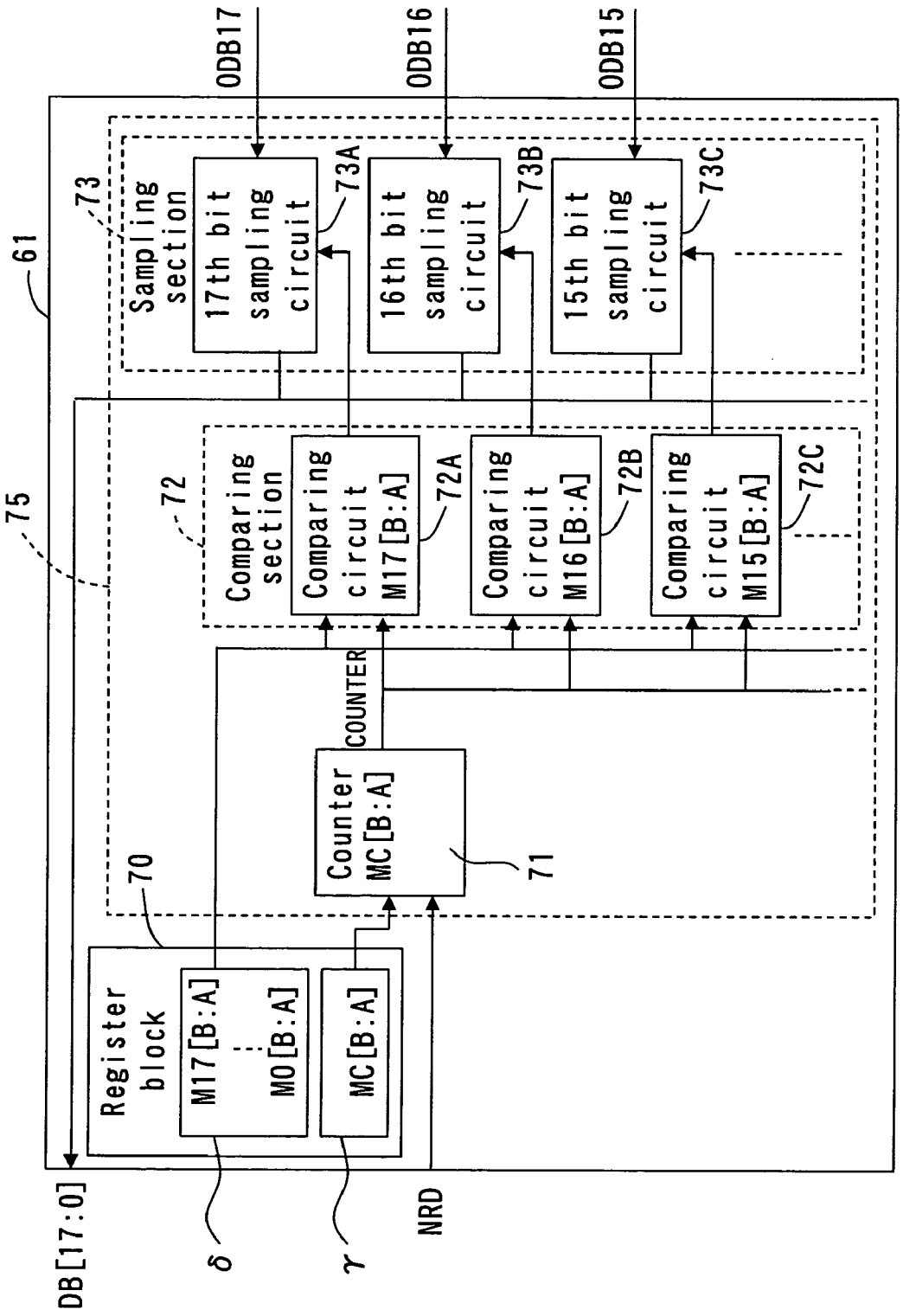
FIG. 7 is a block diagram showing a structure of a control circuit contained in the data bus width conversion apparatus of FIG. 5A.

FIG. 7 is a block diagram showing a detail of a control circuit 61 contained in the data bus width conversion apparatus 220 of FIG. 6.

As shown in FIG. 7, the control circuit 61 comprises a register block 70. The register block 70 comprises a register γ for arbitrarily setting the total number of data read access operations in reading 18-bit width data from the LSI 51 (peripheral device) to the CPU 50 (host system) (the total number of transfer operations of a plurality of divisional bit data groups from the LSI 51 to the CPU 50) and a register δ for setting the ordinal number of a data transfer operation for each data bit of 18-bit width data (i.e., a division pattern of 18-bit width data for dividing data bits of 18-bit width data into a plurality of divisional bit data groups).

The control circuit 61 comprises a dividing section 75. The dividing section 75 corresponds to the receiving section 35 of FIG. 3. The dividing section 75 comprises a counter 71, a comparing section 72, and a sampling section 73.

The counter 71 outputs a count value, i.e., the number of transfer operations (the number of data read strobe operations), in synchronization with a data read signal NRD output from the CPU 50.

The comparing section 72 comprises a plurality of comparing circuits for comparing a value registered in the register δ with a count value of the counter 71. A comparing circuit is provided for each bit of 18-bit width data. Values registered in the register δ are defined based on the above-described division pattern. A registered value indicating the ordinal number of a transfer operation is input to each comparing circuit. The registered value varies depending on the corresponding bit data group. In Embodiment 2, the comparing section 72 comprises 18 comparing circuits (FIG. 7 shows three comparing circuits 72A, 72B, and 72C of the 18 comparing circuits for the sake of simplicity).

The sampling section 73 comprises a plurality of sampling circuits for reading an 18-bit width data bus signal DB[17:0] in accordance with a sampling control signal for each divisional bit data group. A sampling circuit is provided for each bit of 18-bit width data. In Embodiment 2, the sampling section 73 comprises 18 sampling circuits (FIG. 7 shows three sampling circuits 73A, 73B, and 73C of the 18 sampling circuits). The 18 sampling circuits receive sampling signals output from the respective corresponding comparing circuits. The 18 sampling circuits sample the respective data bits of 18-bit width data in accordance with the respective sampling signals.

The structure of the register γ contained in the register block 70 is the same as that of the register α of Table 1. The structure of the register δ is the same as that of the register β of Table 1.

The relationship between values set by registers M*B and M*A corresponding to 18 data bits of a data bus signal, and sampling timings is the same as that of Table 2. Specifically, when values set by the registers M*B and M*A are M*B=M*A=0, the *th bit is read into the CPU 50 in a first data read strobe operation. When M*B=0 and M*A=1, the *th bit is read into the CPU 50 in a second data read strobe operation. When M*B=1 and M*A=0, the *th bit is read into the CPU 50 in a third data read strobe operation. When M*B=1 and M*A=1, the *th bit is read into the CPU 50 in a fourth data read strobe operation.

The relationship between values registered in registers MCB and MCA which indicate the total number of data read access operations (the total number of transfer operations) required for reading an entire data bus signal having a prescribed N-bit width (18-bit width in Embodiment 2), and sampling timings is the same as that of Table 2. The registers MCB and MCA specify the total number of data read strobe operations required for one reading operation from an LSI to a CPU.

Next, a data read access operation of a data bus width conversion apparatus of the present invention when values are set in the registers γ and δ as shown in Table 3, will be described with reference to FIGS. 5A, 6 and 7.

As described above, in Embodiment 2, the CPU 50 having a data bus width of 8 bits is connected with the LSI 51 having a data bus width of 18 bits (FIG. 5A) using a division pattern of 8-8-2.

The CPU 50 outputs the data read signal NRD to an LSI internal circuit 64. In synchronization with this input, the LSI internal circuit 64 outputs 18-bit width data ODB[17:0] to the control circuit 61.

The data read signal NRD is input to the counter 71 within the control circuit 61. The counter 71 counts the number of data read strobe operations in synchronization with the data read signal NRD in reading a data bus signal. The register δ specifies the ordinal number of a data read strobe operation which samples a specific data bit of 18-bit width data.

The register γ outputs a registered value indicating the total number of data read strobe operations (the total number of transfer operations) to the counter 71. The counter 71 counts the number of data read strobe operations in accordance with the data read signal NRD and outputs the resultant counter value to the comparing section 72.

The 18 comparing circuits contained in the comparing section 72 each compare a value registered in the register δ indicating the ordinal number of a data read strobe operation with a counter value indicating the number of data read strobe operations counted by the counter 71. Each comparing circuit, in which the registered value is identical to the counter value, outputs a sampling control signal to a sampling circuit corresponding to the comparing circuit.

The sampling section 73 receives the 18-bit width data bus signal ODB[17:0] from the LSI internal circuit 64. The 18 data bits of the data bus signal ODB[17:0] are input to the respective sampling circuits.

A sampling circuit, which has received a sampling control signal, samples the corresponding data bit of the data bus signal ODB[17:0] in accordance with the received sampling control signal and outputs the sampled data bit to a data bus 60.

For example, in the case of the 17th bit sampling circuit 73A of the sampling section 73, since the values set by the register δ are M17B=M17A=0 according to Tables 2 and 3, a data bit ODB17 is sampled in the first data read strobe operation by the 17th bit sampling circuit 73A and output to a terminal DB17 (FIG. 5A) during one data read cycle.

The counter 71 increments (or decrements) the number of data read strobe operations every time the data read signal NRD is input. When the counter value reaches the value registered in the registers MCB and MCA (in Embodiment 2, "10" since the total number of data read access operations is three), the counter value is reset to an initial value ("00" in Embodiment 2).

Thus, the data bus width conversion apparatus 220 of the present invention comprises the register γ in which the total number of data read access operations by the CPU 50 required for the control circuit 61 to sample N-bit width data is set, and the register δ in which the ordinal number of a data read access operation which samples a specific bit of the N-bit width data is set. Thus, when the CPU 50 having an M-bit width data bus accesses the LSI 51 (peripheral device) having an N-bit width data bus (including M=N), the total number of data read access operations from the LSI 51 to the CPU 50 and a division pattern of a data bus signal are not fixed in hardware and data bus width can be arbitrarily resized for various bus systems.

FIG. 8 is a timing chart of signals in a data read operation of a data bus width conversion apparatus of the present invention.

CPU 50 outputs the data read signal NRD via the connection line section 52 to the LSI internal circuit 64 in the LSI 51.

When receiving the data read signal NRD, the LSI internal circuit 64 outputs 18-bit width data DT1 as a signal ODB[17:0] to the sampling section 73 within the control circuit 61 in synchronization with the data read signal NRD.

In the control circuit 61, the register γ and the register δ in the register block 70 store conditions for reading the data DT1. Specifically, MC[B:A]=10 indicates that a total of three data read strobe operations are required for reading an entire 18-bit width data bus signal. M17[B:A]=00 to M10[B:A]=00 indicate that the 17th bit to the 10th bit are read out in the first data read strobe operation. M9[B:A]=01 to M2[B:A]=01 indicate that the 9th bit to the 2nd bit are read out in the second data read strobe operation. M1[B:A]=10 and M0[B:A]=10 indicate that the 1st bit and the 0th bit are read out in the third data read strobe operation.

Next, the ordinal number of a data read strobe operation corresponding to the data signal DT is a counter value 00, 01, or 10 indicated by the counter 71. When a counter value is identical to a value registered in the register δ, the data signal DT1 is read out by the sampling circuit(s) of the sampling section 73 corresponding to the prescribed bit(s) of 18-bit width data.

In each read strobe operation, the output of each sampling circuit is set to Hi-Z other than a sampleing circuit(s) having a bit which is read. Therefore, 18-bit width data can be completely read out into the CPU 50 having an 8-bit width data bus D[7:0] by three read strobe operations. Note that in the third read strobe operation, the 2 lowest data bits of 8-bit data are valid while the other 6 data bits are "don't care" and do not have an influence on a data transfer operation.

In Embodiment 2, the total number of transfer operations and the ordinal number of a transfer operation are represented by 2 bits in the register γ and the register δ. However, by changing the bit width of the register γ and the register δ, the total number of transfer operations by a CPU when an N-bit width data bus signal is read out (e.g., C times) and the ordinal number of a data read access operation which reads out a specific bit of the N-bit width data, can be freely determined.

Note that the total number of transfer operations and a division pattern may be set in the register γ and the register δ in accordance with an instruction from the CPU 50. Alternatively, the total number of transfer operations and a division pattern may be set in the register γ and the register δ in accordance with the data bus width (and the wiring manner of connection lines) of the CPU 50 recognized by the register block 70. In this case, the dividing section 75 divides and outputs data in accordance with the total number of transfer operations and a division pattern set by the register block 70.

Thus, even when a CPU having an M-bit data bus width is connected to a peripheral device having an N-bit data bus width, the wiring manner of connection lines between the CPU and the peripheral device can be freely determined without hardware limitation.

Further, in the present invention, when a CPU (host system) having an M-bit width data bus accesses an LSI (peripheral device) having an N-bit width data bus (including M=N), the total number of data write access operations by the CPU (or data read operations from the LSI to the CPU) and a division pattern are not fixed in hardware and data bus width can be arbitrarily resized for various bus systems.

Furthermore, in the present invention, when a CPU (host system) having an M-bit width data bus accesses an LSI (peripheral device) having an N-bit width data bus (including M=N), the division pattern and the number of divisions for an N-bit width data bus signal are not fixed. Therefore, it is not necessary to change the bit width of an LSI in hardware when the width of a data bus is resized, for example. Further, the type of an LSI available for a CPU is not limited and a CPU does not require a software processing or the like. Thus, the load on a CPU can be reduced.

Although a data division pattern for 18-bit width data transferred between a CPU and an LSI is 8-8-2 in the above-described embodiments of the present invention CPU, the present invention is not limited to this pattern. For example, a data division pattern may be 6-6-6, 5-6-7, or the like.

Data transfer using the data bus width conversion apparatus of the present invention may be carried out in bi-directional data transfer access between a CPU and an LSI.

The data bus width conversion apparatus of the present invention comprises a setting section in which the total number of transfer operations is set where a CPU (host system) divides N-bit data (N is a positive integer) into a plurality of bit data groups, and a division pattern of the N-bit data for dividing the N-bit data into a plurality of bit data groups. Alternatively, the data bus width conversion apparatus of the present invention comprises a setting section in which the total number of transfer operations is set where N-bit data is divided into a plurality of bit data groups which are in turn transferred to a CPU, and a division pattern of the N-bit data for dividing the N-bit data into a plurality of bit data groups. Therefore, the number of divisions and a division pattern of data can be arbitrarily determined without hardware limitation when data write access is carried out from a CPU (host system) to and LSI (peripheral device) and when data read access is carried out from an LSI (peripheral device) to a CPU (host system).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data bus width conversion apparatus for receiving N-bit data (N is a positive integer) from a first device having a first bus width and outputting the N-bit data to a second device having a second bus width, wherein the first device divides the N-bit data into a plurality of bit data groups and the plurality of bit data groups are transferred to the apparatus, the apparatus comprising:
    a setting section for arbitrarily setting the total number of transfer operations required for the first device to transfer the plurality of bit data groups, and for arbitrarily setting a division pattern of the N-bit data for dividing the N-bit data into the plurality of bit data groups;
    a receiving section for receiving data indicated by each of the plurality of bit data groups in accordance with the total number of transfer operations and the division pattern; and
    an output section for producing the N-bit data from the received data indicated by each of the plurality of bit data groups and outputting the produced N-bit data to the second device.

2. A data bus width conversion apparatus according to claim 1, wherein the first device divides the N-bit data into the plurality of bit data groups in accordance with the total number of transfer operations and the division pattern set by the setting section.

3. A data bus width conversion apparatus according to claim 1, wherein the setting section determines the total number of transfer operations and the division pattern in accordance with the size of the first bus width.

4. A data bus width conversion apparatus according to claim 1, wherein the setting section comprises:
    a first register for setting the total number of transfer operations; and
    a second register for setting the division pattern.

5. A data bus width conversion apparatus according to claim 1, wherein the apparatus outputs the N-bit data to the second device in data write access from the first device to the second device.

6. A data bus width conversion apparatus according to claim 1, wherein the apparatus outputs the N-bit data to the second device in bi-directional data transfer access between the first device and the second device.

7. A data bus width conversion apparatus for dividing N-bit data (N is a positive integer) output from a second device having a second bus width into a plurality of bit data groups and transferring the plurality of bit data groups to a first device having a first bus width, the apparatus comprising:
   a setting section for arbitrarily setting the total number of transfer operations required for transferring the plurality of bit data groups to the first device, and for arbitrarily setting a division pattern of the N-bit data for dividing the N-bit data into the plurality of bit data groups; and
   a dividing section for dividing the N-bit data into the plurality of bit data groups in accordance with the total number of transfer operations and the division pattern.

8. A data bus width conversion apparatus according to claim 7, wherein the apparatus outputs the plurality of bit data groups to the first device in data read access from the second device to the first device.

9. A data bus width conversion apparatus according to claim 7, wherein the apparatus outputs the plurality of bit data groups to the first device in bi-directional data transfer access between the first device and the second device.

10. A data processing apparatus, comprising:
   a data bus width conversion apparatus for receiving N-bit data (N is a positive integer) from a first device having a first bus width and outputting the N-bit data, wherein the first device divides the N-bit data into a plurality of bit data groups and the plurality of bit data groups are transferred to the data bus width conversion apparatus; and
   a second device having a second bus width for receiving the N-bit data output from the data bus width conversion apparatus,
   wherein the data bus width conversion apparatus comprises:
      a setting section for arbitrarily setting the total number of transfer operations required for the first device to transfer the plurality of bit data groups, and for arbitrarily setting a division pattern of the N-bit data for dividing the N-bit data into the plurality of bit data groups;
      a receiving section for receiving data indicated by each of the plurality of bit data groups in accordance with the total number of transfer operations and the division pattern; and
      an output section for producing the N-bit data from the received data indicated by each of the plurality of bit data groups and outputting the produced N-bit data to the second device.

11. A data processing apparatus according to claim 10, wherein the data processing apparatus is a display apparatus.

12. A data processing apparatus, comprising:
   a second device having a second bus width for outputting N-bit data (N is a positive integer); and
   a data bus width conversion apparatus for dividing the N-bit data output from the second device into a plurality of bit data groups and transferring the plurality of bit data groups to a first device having a first bus width, wherein the data bus width conversion apparatus comprises:
      a setting section for arbitrarily setting the total number of transfer operations required for transferring the plurality of bit data groups to the first device, and for arbitrarily setting a division pattern of the N-bit data for dividing the N-bit data into the plurality of bit data groups; and
      a dividing section for dividing the N-bit data into the plurality of bit data groups in accordance with the total number of transfer operations and the division pattern.

13. A data processing apparatus according to claim 1, wherein the data processing apparatus is a display apparatus.

14. A data bus width conversion apparatus according for receiving N-bit data (N is a positive integer) from a first device having a first bus width and outputting the N-bit data to a second device having a second bus width, wherein the first device divides the N-bit data into a plurality of bit data groups and the plurality of bit data groups are transferred to the apparatus, the apparatus comprising:
   a setting section for setting the total number of transfer operations required for the first device to transfer the plurality of bit data groups, and for setting a division pattern of the N-bit data for dividing the N-bit data into the plurality of bit data groups;
   a receiving section for receiving data indicated by each of the plurality of bit data groups in accordance with the total number of transfer operations and the division pattern; and
   an output section for producing the N-bit data from the received data indicated by each of the plurality of bit data groups and outputting the produced N-bit data to the second device,
   wherein the setting section determines the total number of transfer operations and the division pattern in accordance with an instruction from the first device.

15. A data bus width conversion apparatus according for receiving N-bit data (N is a positive integer) from a first device having a first bus width and outputting the N-bit data to a second device having a second bus width, wherein the first device divides the N-bit data into a plurality of bit data groups and the plurality of bit data groups are transferred to the apparatus, the apparatus comprising:
   a setting section for setting the total number of transfer operations required for the first device to transfer the plurality of bit data groups, and for setting a division pattern of the N-bit data for dividing the N-bit data into the plurality of bit data groups;
   a receiving section for receiving data indicated by each of the plurality of bit data groups in accordance with the total number of transfer operations and the division pattern; and
   an output section for producing the N-bit data from the received data indicated by each of the plurality of bit data groups and outputting the produced N-bit data to the second device,
   wherein:
      each of the plurality of bit data groups is transferred by the first device in a transfer operation having a prescribed ordinal number within the total number of transfer operations; and
      the receiving section comprises:
         a counter section for counting the current number of transfer operations within the total number of transfer operations;
         a comparing section for comparing the current number of transfer operations with the ordinal number of transfer operation for each of the plurality of bit data groups; and a sampling section for sampling the plurality of bit data groups in accordance with a result of the comparison.

16. A data bus width conversion apparatus for receiving N-bit data (N is a positive integer) from a first device having a first bus width and outputting the N-bit data to a second device having a second bus width, wherein the first device divides the N-bit data into a plurality of bit data groups and the plurality of bit data groups are transferred to the apparatus, the apparatus comprising:

a setting section for setting the total number of transfer operations required for the first device to transfer the plurality of bit data groups, and for setting a division pattern of the N-bit data for dividing the N-bit data into the plurality of bit data groups;

a receiving section for receiving data indicated by each of the plurality of bit data groups in accordance with the total number of transfer operations and the division pattern; and an output section for producing the N-bit data from the received data indicated by each of the plurality of bit data groups and outputting the produced N-bit data to the second device, wherein:

each of the plurality of bit data groups is transferred by the first device in a transfer operation having a prescribed ordinal number within the total number of transfer operations; and the receiving section comprises:

a counter section for counting the current number of transfer operations within the total number of transfer operations;

a comparing section for comparing the current number of transfer operations with the ordinal number of transfer operation for each of the plurality of bit data groups; and a sampling section for sampling the plurality of bit data groups in accordance with a result of the comparison, wherein the counter section resets the number of counts to an initial value after the current ordinal number of a transfer operation reaches the total number of transfer operations.

* * * * *